United States Patent [19]  [11] Patent Number: 4,764,175
Doré et al.  [45] Date of Patent: Aug. 16, 1988

[54] METAL-FREE MONOAZO AND DISAZO COMPOUNDS HAVING A 1-HYDROXY-5,6-, 7- OR 8- SUBSTITUTED 1,3,5-TRIAZINYLAMINO-3- OR 4 SULFONIC ACID COUPLING COMPONENT RADICAL AND 1:1 COPPER COMPLEXES

[75] Inventors: Jacky Doré, Basle; Reinhard Pedrazzi, Allschwil, both of Switzerland

[73] Assignee: Sandoz Ltd., Basle, Switzerland

[21] Appl. No.: 897,445

[22] Filed: Aug. 15, 1986

[30] Foreign Application Priority Data

Aug. 19, 1985 [DE] Fed. Rep. of Germany ....... 3529661

[51] Int. Cl.$^4$ .................... C09B 29/30; C09B 31/08; D06P 1/06; D06P 3/32
[52] U.S. Cl. .......................................... 8/437; 8/527; 8/686; 8/687; 8/688; 8/918; 8/919; 8/523; 534/603; 534/604; 534/613; 534/614; 534/637; 534/638; 534/693; 534/701; 534/797; 534/803
[58] Field of Search ............... 534/604, 605, 613, 797, 534/614, 638, 693, 701, 803; 8/437, 919, 688, 527

[56]  References Cited
U.S. PATENT DOCUMENTS 4,083,840  4/1978  Schoefberger .................. 534/797
4,363,761 12/1982  Pedrazzi ........................... 534/803
4,544,737 10/1985  Stohr et al. ...................... 534/605
4,594,410  6/1986  Pedrazzi .......................... 534/701

Primary Examiner—A. Lionel Clingman
Attorney, Agent, or Firm—Gerald D. Sharkin; Richard E. Vila; Melvyn M. Kassenoff

[57]  ABSTRACT
Metal-free compounds of the formula,

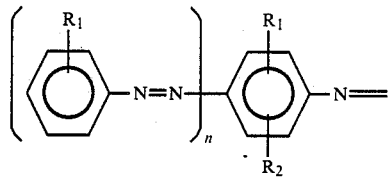

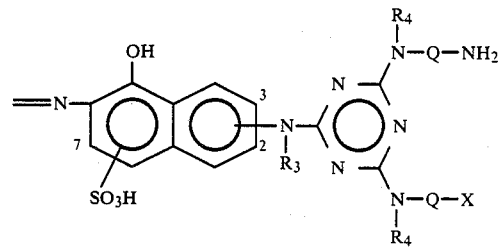

and 1:1 copper complexes of metallizable metal-free compounds of said formula and internal and external salts of metal-free compounds of said formula and of 1:1 copper complexes of metallizable metal-free compounds of said formula, wherein each Q is independently linear or branched $C_{2-6}$alkylene; linear or branched $C_{2-6}$alkylene interrupted by —O—, —S— or —NR$_4$—; linear or branched $C_{3-6}$alkylene monosubstituted or disubstituted by hydroxy or —*NHCO—CH$_2$—, wherein the * denotes the atom attached to the —NR$_4$— radical, each R$_1$ is independently hydrogen, halo, nitro, $C_{1-4}$alkyl, $C_{1-4}$alkoxy, ($C_{1-4}$alkyl)carbonylamino, —SO$_2$NR$_3$R$_4$, —CONR$_4$—C$_6$H$_5$ or benzamido, R$_2$ is hydrogen, hydroxy, halo, nitro, $C_{1-4}$alkyl, $C_{1-4}$alkoxy, ($C_{1-4}$alkyl)carbonylamino or —NHCONR$_3$R$_4$, X is —NR$_5$R$_6$ or —N$^\oplus$R$_7$R$_8$R$_9$ An$^\ominus$, wherein R$_5$-R$_9$ and An$^\ominus$ are as defined in the specification, and n is 0 or 1 wherein each R$_3$ is independently hydrogen, $C_{1-4}$alkyl or $C_{1-4}$alkyl monosubstituted by hydroxy, halo, cyano or $C_{1-4}$alkoxy, and each R$_4$ is independently hydrogen or $C_{1-4}$alkyl, are useful, as such and in the form of solid and liquid aqueous dye preparations as direct dyes for dyeing or printing hydroxy-group or nitrogen-containing organic substrates, such as textiles consisting of or containing cellulose, leather and especially paper; they are also suitable for dyeing glass and products thereof and in inks.

20 Claims, No Drawings

METAL-FREE MONOAZO AND DISAZO COMPOUNDS HAVING A 1-HYDROXY-5,6-, 7- OR 8- SUBSTITUTED 1,3,5-TRIAZINYLAMINO-3- OR 4 SULFONIC ACID COUPLING COMPONENT RADICAL AND 1:1 COPPER COMPLEXES

The invention relates to basic monoazo or disazo compounds containing a sulphonic acid group which compounds are in metal-free or 1:1 copper complex form, and salts thereof and mixtures of these compounds or complexes which may be in internal or external salt form. They are suitable for use as dyestuffs.

According to the invention there is provided compounds of formula I

[Structure: A chemical formula showing a compound with phenyl rings connected by N=N azo bonds, a naphthol core with OH and $SO_3H$ groups, and a triazine ring bearing $R_3$, $R_4$, Q, $NH_2$ and X substituents]

in metal-free or 1:1 copper complex form, in which
n is 0 or 1,
each $R_1$ is independently hydrogen, halogen, nitro, $C_{1-4}$alkyl, $C_{1-4}$alkoxy, —$NHCOC_{1-4}$alkyl, —$SO_2NR_3R_4$, —$CONR_4C_6H_5$ or —$NHCOC_6H_5$,
$R_2$ is hydrogen, hydroxy, halogen, nitro, $C_{1-4}$alkyl, $C_{1-4}$alkoxy, —$NHCOC_{1-4}$alkyl or —NHCON$R_3R_4$,
each $R_3$ is independently hydrogen; $C_{1-4}$alkyl; or $C_{1-4}$alkyl monosubstituted by hydroxy, halogen, cyano or $C_{1-4}$alkoxy,
each $R_4$ is independently hydrogen or $C_{1-4}$alkyl,
each Q is independently $C_{2-6}$alkylene, which may be interrupted by —O—, —S— or —N($R_4$)—; $C_{3-6}$alkylene substituted by one or two hydroxy groups; or —*$NHCOCH_2$—, where * denotes the atom bound to the —$NR_4$-radical,
X is —$NR_5R_6$ or —$N^{\oplus}R_7R_8R_9$ $An^{\ominus}$,
each of $R_5$ and $R_6$ is independently hydrogen; $C_{1-6}$alkyl; $C_{2-6}$alkyl monosubstituted by hydroxy or cyano; phenyl or phenyl($C_{1-4}$-alkyl), the phenyl group of the latter two groups being unsubstituted or substituted by up to three groups selected from chlorine, $C_{1-4}$alkyl and $C_{1-4}$alkoxy; $C_{5-6}$cycloalkyl which is unsubstituted or substituted by one to three $C_{1-4}$alkyl groups; or $R_5$ and $R_6$, together with the nitrogen atom to which they are attached, form a 5- or 6-membered saturated or unsaturated ring which contains one to three hetero atoms and is unsubstituted or substituted by one to three groups selected from $C_{1-4}$alkyl and $C_{2-4}$alkyl monosubstituted by hydroxy or amino,
each of $R_7$ and $R_8$ has independently one of the non-cyclic or cyclic significances of $R_5$ and $R_6$ except hydrogen, and
$R_9$ is $C_{1-4}$alkyl or benzyl, or
$R_7$, $R_8$ and $R_9$, together with the nitrogen atom to which they are attached, form a pyridinium group which is unsubstituted or substituted by one or two methyl groups, and
$An^{\ominus}$ is a non-chromophoric anion, which compound or complex of formula I may be in internal or external salt form.

Where in the phenyl group bearing $R_1$ and $R_2$, one of the $R_1$ and $R_2$ is in an ortho position to the >C—N=N-naphthol radical and is a metallisable group, such as hydroxy or $C_{1-4}$alkoxy, or is hydrogen or halogen to be split off, the compound of formula I may be in a 1:1 copper complex form in which the metal is bound via two oxygen atoms.

Preferably, the compounds of formula I are metal-free.

Preferably, n is 0.

Particularly preferred are metal-free compounds of formula I in which n is 0.

In this specification halogen means fluorine, chlorine or bromine, more preferably chlorine or bromine, especially chlorine.

Any alkyl or alkylene present is linear or branched unless indicated to the contrary.

In any hydroxy- or alkoxy-substituted alkyl or alkylene group which is linked to a nitrogen atom, the hydroxy or alkoxy group is bound to a carbon atom other than to the $C_1$-atom. In any alkylene group substituted by two hydroxy groups, the hydroxy groups are bound to different carbon atoms.

Any halogen as $R_1$ or $R_2$ is preferably chlorine. Any alkyl or alkoxy preferably contains 1 or 2 carbon atoms and is most preferably methyl or methoxy. Any acylamino group is preferably acetamido.

Any alkyl as $R_3$ preferably contains 1 or 2 carbon atoms, more preferably is methyl. Any substituted alkyl is preferably linear or branched $C_{1-3}$alkyl preferably containing one group selected from hydroxy, chlorine and cyano, most preferably it is monosubstituted by hydroxy.

$R_3$ is preferably $R_{3a}$, where each $R_{3a}$ is independently hydrogen, methyl, ethyl or 2-hydroxyethyl. Most preferably, $R_3$ is hydrogen.

Any alkyl as $R_4$ is preferably methyl.

$R_4$ is preferably $R_{4a}$, where each $R_{4a}$ is independently hydrogen or methyl, especially hydrogen.

$R_1$ is preferably $R_{1a}$, where each $R_{1a}$ is independently hydrogen, chlorine, nitro, $C_{1-2}$alkyl, $C_{1-2}$alkoxy, —$NHCOCH_3$, —$SO_2NR_{3a}R_{4a}$, —$CONR_4C_6H_5$ or —$NHCOC_6H_5$. More preferably, $R_1$ is $R_{1b}$, where each $R_{1b}$ is independently hydrogen, chlorine, nitro, methyl, methoxy or —$NHCOCH_3$. Even more preferably, $R_1$ is $R_{1c}$, where each $R_{1c}$ is independently hydrogen, methyl or methoxy. Most preferably, $R_1$ is hydrogen.

$R_2$ is preferably $R_{2a}$, where $R_{2a}$ is hydrogen, hydroxy, $C_{1-2}$alkyl, $C_{1-2}$alkoxy, —$NHCOCH_3$ or —$NHCONH_2$. More preferably, $R_2$ is $R_{2b}$, where $R_{2b}$ is hydrogen, hydroxy, $C_{1-2}$alkyl or $C_{1-2}$alkoxy. Even more preferably, $R_2$ is $R_{2c}$, where $R_{2c}$ is hydrogen, methyl or methoxy. Most preferably, $R_2$ is methoxy.

In the naphthol radical the sulpho group is preferably in the 3-position, and the substituted amine group is preferably in the 6-position.

Any branched alkylene as Q is preferably

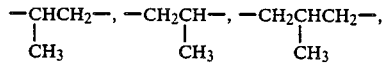

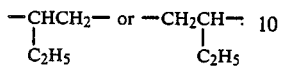

When Q as alkylene is interrupted by a hetero atom it is preferably a group —(CH$_2$)$_{2\text{-}3}$—Y—(CH$_2$)$_{2\text{-}3}$—, in which Y is —O— or —N(R$_{4a}$)—; most preferably it is a group —(CH$_2$)$_2$—NH—(CH$_2$)$_2$.

Q is preferably Q$_a$, where each Q$_a$ is independently C$_{2\text{-}4}$alkylene, monohydroxy-substituted C$_{3\text{-}4}$alkylene or —(CH$_2$)$_{2\text{-}3}$—Y—(CH$_2$)$_{2\text{-}3}$—. More preferably, Q is Q$_b$, where each Q$_b$ is independently —(CH$_2$)$_{2\text{-}3}$—,

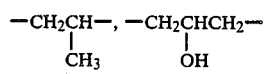

or —(CH$_2$)$_2$—NH—(CH$_2$)$_2$—. Most preferably, Q is Q$_c$, where Q$_c$ is —(CH$_2$)$_{2\text{-}3}$— or

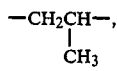

or if X is other than NH$_2$, Q is also Q$_d$, where Q$_d$ is —(CH$_2$)$_{2\text{-}3}$—.

Any alkyl as R$_5$ or R$_6$ is preferably C$_{1\text{-}4}$alkyl, especially methyl or ethyl. Any substituted alkyl is preferably an ethyl or propyl group monosubstituted by cyano or hydroxy in the 2- or 3-position.

In any phenyl or phenylalkyl group as R$_5$ or R$_6$ each phenyl ring is preferably unsubstituted or substituted by one or two groups selected from chlorine, methyl and methoxy; more preferably, the phenyl ring is unsubstituted. Most preferably, a phenylalkyl group is benzyl, in which the phenyl ring is unsubstituted.

Any cycloalkyl as R$_5$ or R$_6$ is preferably cyclohexyl. Any alkylsubstituted cycloalkyl is preferably cyclohexyl which is substituted by one to three methyl groups.

Where R$_5$ and R$_6$, together with the nitrogen atom to which they are attached, form a heterocyclic ring, it is preferably a pyrrolidine, piperidine, morpholine, piperazine or N-methylpiperazine group.

Most preferably, R$_5$ and R$_6$ are identical.

R$_5$ and R$_6$ are preferably R$_{5a}$ and R$_{6a}$, where each of R$_{5a}$ and R$_{6a}$ is independently hydrogen, C$_{1\text{-}6}$alkyl, hydroxy-C$_{2\text{-}3}$alkyl or benzyl, or R$_{5a}$ and R$_{6a}$, together with the nitrogen atom to which they are attached, form a pyrrolidine, piperidine, morpholine, piperazine or N-methylpiperazine group. More preferably, they are R$_{5b}$ and R$_{6b}$, where R$_{5b}$ and R$_{6b}$ are identical and each of R$_{5b}$ and R$_{6b}$ is hydrogen, C$_{1\text{-}4}$alkyl or 2-hydroxyethyl, or R$_{5b}$ and R$_{6b}$, together with the nitrogen atom to which they are attached, form a piperidine, morpholine, piperazine or N-methylpiperazine group.

Most preferably, R$_5$ and R$_6$ are R$_{5c}$ and R$_{6c}$, where R$_{5c}$ and R$_{6c}$ are identical and each of R$_{5c}$ and R$_{6c}$ is hydrogen, methyl or ethyl.

Preferably, R$_7$ and R$_8$ are identical.

R$_7$ and R$_8$ are preferably R$_{7a}$ and R$_{8a}$, where each of R$_{7a}$ and R$_{8a}$ is independently C$_{1\text{-}6}$alkyl or hydroxy-C$_{2\text{-}3}$alkyl, or R$_{7a}$ and R$_{8a}$, together with R$_9$ and the nitrogen atom to which R$_{7a}$, R$_{8a}$ and R$_9$ are attached, form a pyridinium ring which is unsubstituted or substituted by one or two methyl groups. More preferably, they are R$_{7b}$ and R$_{8b}$, where R$_{7b}$ and R$_{8b}$ are identical and each of R$_{7b}$ and R$_{8b}$ is C$_{1\text{-}4}$alkyl or 2-hydroxyethyl, or R$_{7b}$ and R$_{8b}$, together with R$_9$ and the nitrogen atom to which R$_{7b}$, R$_{8b}$ and R$_9$ are attached, form a pyridinium ring which is unsubstituted or monosubstituted by methyl. Most preferably, R$_7$ and R$_8$ are R$_{7c}$ and R$_{8c}$, where R$_{7c}$ and R$_{8c}$ are identical and each of R$_{7c}$ and R$_{8c}$ is methyl or ethyl.

Any alkyl as R$_9$ is preferably methyl or ethyl, especially methyl.

R$_9$ is preferably R$_{9a}$, where R$_{9a}$ is methyl, ethyl or benzyl, or together with R$_{7a}$ and R$_{8a}$ and the nitrogen atom to which R$_{7a}$, R$_{8a}$ and R$_{9a}$ are attached, forms a pyridinium ring which is unsubstituted or substituted by one or two methyl groups. More preferably, it is R$_{9b}$, where R$_{9b}$ is methyl, ethyl or benzyl, or together with R$_{7b}$ and R$_{8b}$ and the nitrogen atom to which R$_{7b}$, R$_{8b}$ and R$_{9b}$ are attached, forms a pyridinium ring which is unsubstituted or monosubstituted by methyl.

X is preferably X$_a$, where X$_a$ is —NR$_{5a}$R$_{6a}$ or —N$^\oplus$R$_{7a}$R$_{8a}$R$_{9a}$ An$^\ominus$; more preferably, it is X$_b$, where X$_b$ is —NR$_{5b}$R$_{6b}$ or —N$^\oplus$R$_{7b}$R$_{8b}$R$_{9b}$ An$^\ominus$; most preferably, X is X$_c$, where X$_c$ is —NR$_{5c}$R$_{6c}$.

Preferred compounds according to the invention correspond to formula Ia

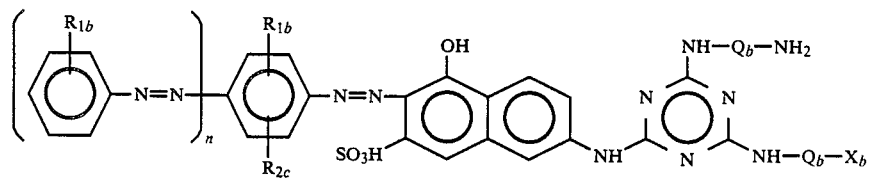

which compounds are metal-free and are internal or external salt form.

More preferred are metal-free compounds of formula Ia in which
(1) each R$_{1b}$ is independently R$_{1c}$;
(2) each R$_{1b}$ is hydrogen and R$_{2c}$ being methoxy is in the o- or p-position (provided that n is 0) with respect to the azo group;
(3) those of (2) in which n is 0 and R$_{2c}$ is methoxy bound in the o- or p-position, particularly in the o-position with respect to the azo group;
(4) —Q$_b$—X$_b$ is —Q$_c$—X$_c$;
(5) those of (4) in which —Q$_b$—X$_b$ is —Q$_d$—X$_c$;
(6) those of (1) to (4) in which-Q$_b$—NH$_2$ is —Q$_c$—NH$_2$ and —Q$_b$—X$_b$ is —Q$_c$—NH$_2$ which groups —Q$_c$—NH$_2$ are identical.

Normally, in a compound of formula I the sulphonic acid group is ionised and is present as $SO_3^\ominus$. It may form an internal salt either with the basic amino group $-Q-NH_2$ or with the basic amino group $-Q-X$ or it is capable of forming an external salt under alkaline conditions. Any basic amino group which does not participate in an internal salt is capable of forming an external salt, e.g., an acid addition salt by reacting with a suitable acid; examples of suitable acids are mineral acids such as hydrochloric acid, sulphuric acid and phosphoric acid, or preferably organic acids such as formic acid, acetic acid, methoxyacetic acid, lactic acid, citric acid, glycolic acid and methanesulphonic acid. If X is a quaternary ammonium group

$An^\ominus$, the anion $An^\ominus$ may be any non-chromophoric inorganic or organic anion, for example of those conventional in basic dyestuff chemistry. Suitable anions include chloride, bromide, iodide, lactate, acetate, propionate, citrate, oxalate, malate, maleate, succinate, methyl sulphate, ethyl sulphate and hydrogen sulphate.

The present invention further provides a process for the preparation of compounds of formula I comprising reacting the diazonium salt of an amine of formula II

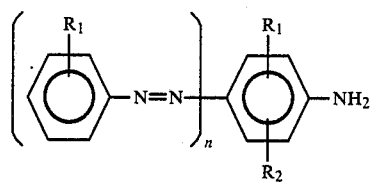

in which $R_1$, $R_2$ and n are as defined above, with a compound of formula III,

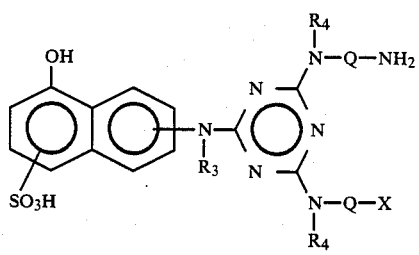

in which $R_3$, $R_4$, Q and X are as defined above, and optionally converting the metal-free compound of formula I thus obtained into the 1:1 copper complex by reacting with a copper-donating compound.

Diazotisation and coupling may be effected in accordance with conventional methods. The coupling reaction advantageously is carried out in an aqueous reaction medium in a temperature range of from 0° to 60° C., preferably at 20° to 50° C., and in a pH range of from 3 to 9, preferably at pH 4 to 6.

A metal-free compound of formula I, in which one of the ortho-positions of the phenyl group with respect to the carbon atom of the $>C-N=N$-naphthol radical is unsubstituted or substituted by halogen, hydroxy or $C_{1-4}$alkoxy, may be converted into a 1:1 copper complex in accordance with known methods. This coppering may be carried out by reacting an appropriate metal-free compound of formula I with a copper-donating compound which is employed in such an amount to provide at least one equivalent of copper per equivalent of monoazo compound to be metallised.

Suitably, the 1:1 copper complexes may be prepared either by oxidative coppering, preferably at 40° to 70° C. and at pH 4 to 7 in the presence of copper(II) salts, or using copper powder in the presence of hydrogen peroxide or any other conventional oxidising agents; or preferably by demethylation coppering in the presence of copper(II) salts, preferably at pH 2 to 6 and at elevated to boiling temperature with the addition of metal acetates, or at pH 6 to 11 at elevated to boiling temperature with the addition of an aqueous ammonia solution or an aliphatic amine.

The compounds of formula I thus obtained may be isolated in accordance with known methods.

The compounds or complexes of formula I containing free basic groups may be converted wholly or in part into water-soluble salts by reacting with an inorganic or organic acid given above.

The starting compounds, the amines of formula II, are either known or may be prepared in accordance with known methods from available starting materials. The compounds of formula III may be prepared by stepwise replacing the chlorine atoms of cyanuric chloric whereby in a first and second step cyanuric chloride is reacted with a diamine of formulae IV and V, respectively,

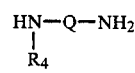

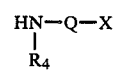

in which $R_4$, Q and X are as defined above.

In the case where identical diamino groups have to be introduced, this first and second step may be combined to one step. Suitably, it is carried out at temperatures of from 0° to 30° C. and preferably at pH 4–6.

Where different diamino groups have to be introduced, suitably, in the first step the diamine showing the higher selectivity with respect to the condensation reaction. Both condensation steps may be carried out using the conventional reaction temperatures in an acid reaction medium where the upper limit of pH is 7.

The final third step, the condensation with the aminonaphthol component, is carried out at elevated temperatures and at pH 2–3.

The starting compounds of formulae IV and V are either known or may be prepared in accordance with known methods from available starting materials.

The compounds and complexes according to the invention, in acid addition salt form or quaternary ammonium salt form, are dyestuffs and are useful for dyeing of cationic dyeable materials such as homo or mixed polymers or acrylonitrile, acid modified polyester, polyamide e.g. wool; leather, cotton, bast fibres such as hemp, flax, sisal, jute, coir and straw; regenerated cellulose fibres, glass fibres and paper.

For instance, the compounds of formula I are used for dyeing or printing of fibres, filaments and textiles consisting of or containing cellulose e.g. cotton in accordance with known methods. Cotton is preferably dyed by the conventional exhaust method from a long or short liquor using temperatures from room to boiling temperature. Printing may be effected by impregnation with a printing paste produced by known methods.

The new compounds and complexes can also be used for dyeing and printing of leather, including low affinity vegetable-tanned leather, as well as glass or glass products consisting of variable chemical components in accordance with known methods. Furthermore, the dyestuffs are suitable for the preparation of inks in accordance with conventional methods.

Most preferably, the dyestuffs are used for dyeing or printing of paper e.g., for the preparation of sized or unsized, wood-free or ligneous paper. They may be used for the production of pulp-coloured paper or of paper dyed in the size press. Similarly, the dyestuffs may be used for dyeing paper by the dipping process. The dyeing and printing of paper is effected by known methods.

The dyeings and prints and particularly those obtained on paper show good fastness properties.

The compounds of formula I may be converted into dyeing preparations. Processing into stable liquid, preferably aqueous, or solid dyeing preparations may take place in a generally known manner; advantageously, suitable liquid dyeing preparations may be made by dissolving the dyestuff in suitable solvents such as mineral acids or organic acids, e.g., hydrochloric acid, sulphuric acid, phosphoric acid, formic acid, acetic acid, lactic acid, glycolic acid, citric acid and methanesulphonic acid; Furthermore formamide, dimethylformamide, urea, glycols and ethers thereof, dextrin or addition products of boric acid with sorbit may be used together with water, optionally adding an assistant, e.g. a stabiliser. Such preparations may be obtained, for example, as described in French patent specification No. 1,572,030.

An example of a suitable liquid dye preparation is (all parts are by weight):

| | | |
|---|---|---|
| 100 parts | of a compound of formula I in acid addition salt form or in quaternary ammonium salt form, | |
| 0–10 part, | preferably 0–1 parts of an inorganic salt, | |
| 1–100 parts | of an organic acid such as formic, acetic, lactic, citric acid etc. | |
| 100–800 parts | of water, | |
| 0–500 parts | of a solubilising agent (e.g., glycols such as ethylene glycol, propylene glycol, diethylene glycol triethylene glycol and hexylene glycol; glycol ethers such as methyl cellosolve, methyl carbitol, butylpolyglycol; urea; formamide and dimethylformamide). | |

Advantageously, solid dyeing preparations may be made by grinding or, preferably, granulating for example, in accordance with the method described in French patent specification No. 1,581,900.

A suitable granulate preparation comprises (all parts are by weight):

| | | |
|---|---|---|
| 100 parts | of a compound of formula I in acid addition salt form or quaternary ammonium salt form, | |
| 0–10 part, | preferably 0–1 parts of an inorganic salt, | |
| 0–800 parts | of a standardising agent (preferably non-ionic such as dextrin, sugar, glucose and urea). | |

The solid preparation may contain up to 10% residual moisture.

The compounds of formula I (in the corresponding salt form) have good solubility especially in cold water. Owing to their high substantivity the dyestuffs exhaust practically quantitatively and show a good build-up power. When producing sized or unsized paper the waste water is essentially colourless. The dyestuffs can be added to the stock directly, i.e. without previously dissolving, as a dry powder or granulate, without reducing the brilliance or the yield of colour. A sized paper dyeing when compared with the corresponding unsized paper dyeing does not show any decrease in strength. The dyestuffs can also be used in soft water without loss of yield. They do not mottle when applied on paper, are not inclined to give two-sided dyeing on paper and are practically insensitive to filler or pH variations.

The paper dyeings made with the compounds and complexes according to the invention are clear and brilliant and have good light fastness; on exposure to light for a long time the shade of the dyeing fades tone in tone. The dyeings on paper show high wet fastness properties; they are fast not only to water but also to milk, fruit juice, sweetened mineral water, tonic water, soap and sodium chloride solution, urine etc. Furthermore, the paper dyeings have good alcohol fastness properties.

Paper dyed with the new dyestuffs can be bleached oxidatively or reductively which is important for the recycling of waste and old paper.

The dyestuffs may also be used to dye paper containing wood-pulp were even dyeings having good fastness properties are obtained. Furthermore, the dyestuffs may be used for the production of coated paper in accordance with known manner. Preferably, a suitable filler, for example kaolin, which due to its tendency for pigmentation is dyed with the dyestuff, is employed to give a one side coated paper.

The new dyestuffs are also suitable for dyeing in combination. The thus obtained dyeings have good fastness properties.

The following Examples further serve to illustrate the invention. In the Examples all parts and all percentages are by weight or volume, and the temperatures given are in degrees Centigrade, unless indicated to the contrary.

EXAMPLE 1

(a) Diazotisation 10.86 Parts (0.088 mols) of 2-amino-1-methoxybenzene are added to a mixture of 40 parts of ice and 25 parts of a 30% hydrochloric acid. A solution containing 6.1 parts (0.088 mols) of sodium nitrite in 25 parts of water is added dropwise at 0°–5°.

(b) Preparation of the coupling component

To a mixture consisting of 14.8 parts (0.2 mols) of 1,2-diaminopropane and 100 parts of ice, 46 parts of a 30% hydrochloric acid are added dropwise to set the pH in a range of 3 to 5. The temperature is adjusted at 0°–3°. Then 18.4 parts (0.1 mols) of cyanuric chloride are added, and the mixture is homogenised by stirring.

Reacting is effected for four to five hours, during this time 53 parts of a 30% sodium hydroxide solution are slowly added at such a rate to keep the pH at 5 to 5.5. During the addition of half the quantity of sodium hydroxide solution to be added (ca. 27 parts) the temperature should not exceed a limit of 12°. Simultaneously, a pH of 5 is maintained. When the whole quantity of sodium hydroxide has been added (at the end of the reaction) a pH of 5.5 and a temperature of 25°-30° should have been reached. The dull solution of the reaction product which no longer contains any amount of monosubstituted cyanuric chloride is filtered clear by adding filter earth.

To the clear solution 21.5 parts (0.09 mols) of 2-amino-4-hydroxynaphthalene-7-sulphonic acid are added. The thus obtained suspension is heated to 80°, whereby the pH is kept at 2.2 to 2.6 by the addition of 13 parts of a 30% sodium hydroxide solution. After one hour at 80° the reaction is completed.

(c) Coupling

The solution of the coupling component as prepared under 1(b) is cooled to 40°-45°, then 34 parts of sodium acetate are added whereby the pH increases to 4–5. During 15 minutes the diazo solution as prepared under 1(a) is added at 40°. Subsequently, within two hours 38 parts of a 17% sodium hydroxide solution are added dropwise at such a regular rate to increase the pH to approximately 5. The obtained dyestuff suspension is adjusted at pH 8–9 by the addition of sodium carbonate and filtered. A dyestuff having the formula

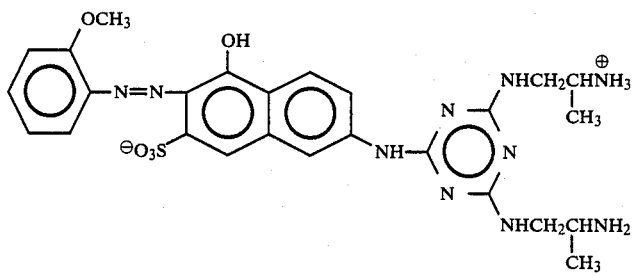

is obtained which is well soluble in dilute acids, preferably in organic acids such as formic, lactic, acetic and methoxy acetic acid. This solution dyes paper a brilliant scarlet shade. The paper dyeings show notably good light and wet fastness properties; they are fast to water, alcohol, milk, soap- and sodium chloride-solution, tonic water, urine etc., and are easily bleachable. This dyestuff does not incline to give two-sided dyeing on paper.

EXAMPLE 2

(a) Preparation of the coupling component 18.4 Parts (0.1 mols) of cyanuric chloride are stirred into 20 parts of water and 50 parts of ice. at 0°-5°, a solution which consists of 13 parts (0.1 mols) of 3-N,N-diethylamino propylamine, 50 parts of ice and ca. 23 parts of a 30% hydrochloric acid having a pH of 5-6 is added dropwise within 10 minutes. The pH of the mixture is adjusted at 6-6.5 by adding a 20% sodium carbonate solution, and the temperature is kept at 0°-5° for four hours. A white suspension is obtained containing the monosubstituted cyanuric chloride.

Subsequently, an amine solution of pH 6 consisting of 6 parts (0.1 mols) of ethylenediamine, 40 parts of ice and ca. 20 parts of a 30% hydrochloric acid solution is added dropwise within 10 minutes. For ten hours the pH of the reaction mixture is kept at 6, whereby the temperature rises to room temperature (20°-25°) very slowly.

The slight dull solution of the disubstituted cyanuric chloride thus obtained is filtered clear. 21.5 Parts of 2-amino-5-hydroxynaphthalene-7-sulphonic acid are added, the mixture is heated to 80° and the temperature is kept at 80° for one hour. During this time the pH of the reaction mixture is kept at 2.5 by continuous addition of a 20% sodium carbonate solution.

(b) Coupling

The coupling component prepared under 2(a) is reacted with the diazo solution prepared under 1(a) in accordance with the method described under step (c) of Example 1. The dyestuff having the formula

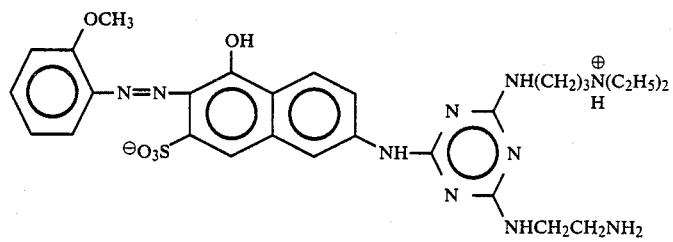

is obtained which, dissolved in an organic acid, dyes paper a brilliant scarlet shade. The paper dyeings show good light and wet fastness properties and are well bleachable.

EXAMPLES 3 TO 45

By a method analogous to that of Examples 1 and 2 further compounds of formula I may be prepared using appropriate starting compounds. They correspond to formula (A)

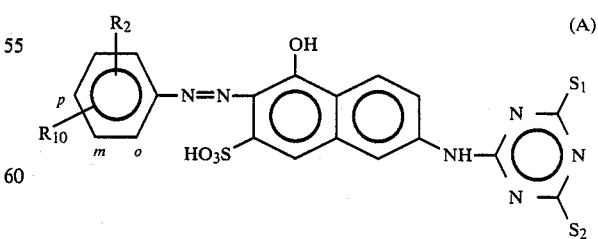

in which the symbols are defined in the following Table. In the last column I of this Table the shade of dyeing on bleached cellulose obtained with each dyestuff is given, whereby a is scarlet b is red
c is bluish red
d is yellowish orange.

The thus obtained dyeings show good light and wet fastness properties and are well bleachable.
In the Table, $An^\ominus$ is an anion of the reaction medium.

TABLE

| Ex. No. | compounds of formula (A) $R_{10}$ (position) | $R_2$ (position) | $S_1$ | $S_2$ | I |
|---|---|---|---|---|---|
| 3 | H | —OCH$_3$ (o) | —NH(CH$_2$)$_2$NH$_2$ | —NH(CH$_2$)$_2$NH$_2$ | a |
| 4 | H | —OCH$_3$ (o) | —NH(CH$_2$)$_3$N(C$_2$H$_5$)$_2$ | —NHCH$_2$CHNH$_2$<br>\|<br>CH$_3$ | a |
| 5 | H | —OCH$_3$ (o) | —NH(CH$_2$)$_3$N(C$_2$H$_5$)$_2$ | —NH(CH$_2$)$_2$NH(CH$_2$)$_2$NH$_2$ | a |
| 6 | H | —OCH$_3$ (o) | —NH(CH$_2$)$_3$N(C$_2$H$_5$)$_2$ | —NH(CH$_2$)$_3$NH$_2$ | a |
| 7 | H | —OCH$_3$ (o) | —NH(CH$_2$)$_3$N(C$_2$H$_5$)$_2$ | —NHCH$_2$CHCH$_2$NH$_2$<br>\|<br>OH | a |
| 8 | H | —OCH$_3$ (o) | —NH(CH$_2$)$_2$N(C$_2$H$_5$)$_2$ | —NH(CH$_2$)$_2$NH$_2$ | a |
| 9 | H | —OCH$_3$ (o) | —NH(CH$_2$)$_2$N(CH$_3$)$_2$ | —NH(CH$_2$)$_2$NH$_2$ | a |
| 10 | H | —OCH$_3$ (o) | —NH(CH$_2$)$_2$N(C$_2$H$_5$)$_2$ | —NH(CH$_2$)$_3$NH$_2$ | a |
| 11 | H | —OCH$_3$ (o) | —N(CH$_2$)$_2$N(C$_2$H$_5$)$_2$<br>\|<br>CH$_3$ | —NHCH$_2$CHNH$_2$<br>\|<br>CH$_3$ | a |
| 12 | H | —OCH$_3$ (p) | —NHCH$_2$CHNH$_2$<br>\|<br>CH$_3$ | —NHCH$_2$CHNH$_2$<br>\|<br>CH$_3$ | a |
| 13 | H | —OCH$_3$ (p) | —NH(CH$_2$)$_2$NH$_2$ | —NH(CH$_2$)$_2$NH$_2$ | a |
| 14 | H | —OCH$_3$ (p) | —NH(CH$_2$)$_3$N(C$_2$H$_5$)$_2$ | —NH(CH$_2$)$_2$NH$_2$ | a |
| 15 | H | —OCH$_3$ (p) | —NH(CH$_2$)$_3$N(C$_2$H$_5$)$_2$ | —NHCH$_2$CHNH$_2$<br>\|<br>CH$_3$ | a |
| 16 | H | —OCH$_3$ (p) | —NH(CH$_2$)$_3$N(C$_2$H$_5$)$_2$ | —NHCH$_2$CHCH$_2$NH$_2$<br>\|<br>OH | a |
| 17 | H | —OCH$_3$ (p) | —NH(CH$_2$)$_2$N(C$_2$H$_5$)$_2$ | —NH(CH$_2$)$_2$NH$_2$ | a |
| 18 | H | —NHCOCH$_3$ (p) | —NH(CH$_2$)$_3$N(C$_2$H$_5$)$_2$ | —NH(CH$_2$)$_2$NH$_2$ | b |
| 19 | H | —NHCOCH$_3$ (p) | —NH(CH$_2$)$_3$N(C$_2$H$_5$)$_2$ | —NHCH$_2$CHNH$_2$<br>\|<br>CH$_3$ | b |
| 20 | H | —NHCOCH$_3$ | —NH(CH$_2$)$_3$N$^\oplus$(CH$_3$)$_3$ An$^\ominus$ | —NHCH$_2$CHNH$_2$<br>\|<br>CH$_3$ | b |
| 21 | H | —NHCOCH$_3$ (p) | —NHCH$_2$CHNH$_2$<br>\|<br>CH$_3$ | —NHCH$_2$CHNH$_2$<br>\|<br>CH$_3$ | b |
| 22 | H | —NHCOCH$_3$ (p) | —NHCH$_2$CHCH$_2$NH$_2$<br>\|<br>OH | —NHCH$_2$CHCH$_2$NH$_2$<br>\|<br>OH | b |
| 23 | H | —NHCOCH$_3$ (p) | —NH(CH$_2$)$_2$NH$_2$ | —NH(CH$_2$)$_2$NH$_2$ | b |
| 24 | H | —NHCOCH$_3$ (p) | —NH(CH$_2$)$_2$NH$_2$ | —NH(CH$_2$)$_3$NHCH$_3$ | b |
| 25 | H | —NHCOCH$_3$ (p) | —NHCH$_2$CHNH$_2$<br>\|<br>CH$_3$ | —NH(CH$_2$)$_3$NHCH$_3$ | b |
| 26 | —NO$_2$ (p) | —OCH$_3$ (o) | —NHCH$_2$CHNH$_2$<br>\|<br>CH$_3$ | —NHCH$_2$CHNH$_2$<br>\|<br>CH$_3$ | c |
| 27 | —NO$_2$ (p) | —OCH$_3$ (o) | —NH(CH$_2$)$_3$N(C$_2$H$_5$)$_2$ | —NH(CH$_2$)$_2$NH$_2$ | c |
| 28 | —NO$_2$ (p) | —OCH$_3$ (o) | —NH(CH$_2$)$_3$N(C$_2$H$_5$)$_2$ | —NHCH$_2$CHNH$_2$<br>\|<br>CH$_3$ | c |

TABLE-continued

| Ex. No. | compounds of formula (A) R$_{10}$ (position) | R$_2$ (position) | S$_1$ | S$_2$ | I |
|---|---|---|---|---|---|
| 29 | —NO$_2$ (p) | —OCH$_3$ (o) | —NH(CH$_2$)$_2$NH$_2$ | —NH(CH$_2$)$_2$NH$_2$ | c |
| 30 | —N=N—C$_6$H$_4$ (p) | H | —NH(CH$_2$)$_3$N(C$_2$H$_5$)$_2$ | —NH(CH$_2$)$_2$NH$_2$ | c |
| 31 | —N=N—C$_6$H$_4$ (p) | H | —NHCH$_2$CHNH$_2$ \| CH$_3$ | —NHCH$_2$CHNH$_2$ \| CH$_3$ | c |
| 32 | H | —SO$_2$NH$_2$ (p) | —NHCH$_2$CHNH$_2$ \| CH$_3$ | —NHCH$_2$CHNH$_2$ \| CH$_3$ | a |
| 33 | H | —Cl (o) | —NHCH$_2$CHNH$_2$ \| CH$_3$ | —NHCH$_2$CHNH$_2$ \| CH$_3$ | a |
| 34 | H | —CH$_3$ (o) | —NHCH$_2$CHNH$_2$ \| CH$_3$ | —NHCH$_2$CHNH$_2$ \| CH$_3$ | a |
| 35 | H | —OCH$_3$ (o) | —NHCH$_2$CHNH$_2$ \| CH$_3$ | —NH(CH$_2$)$_3$N(morpholino) | a |
| 36 | H | —OCH$_3$ (o) | —NH(CH$_2$)$_3$N$^{\oplus}$(CH$_3$)$_3$ An$^{\ominus}$ | —NHCH$_2$CH$_2$NH$_2$ | a |
| 37 | H | —CH$_3$ (p) | —NH(CH$_2$)$_3$N$^{\oplus}$(CH$_3$)$_3$ An$^{\ominus}$ | —NHCH$_2$CH$_2$NH$_2$ | a |
| 38 | H | —OCH$_3$ (o) | —NHCH$_2$CHCH$_2$NH$_2$ \| OH | —NH(CH$_2$)$_3$N(piperazino)NCH$_2$CH$_2$NH$_2$ | a |
| 39 | H | —OCH$_3$ (p) | —NHCH$_2$CHCH$_2$NH$_2$ \| OH | —NH(CH$_2$)$_2$N(piperazino)NCH$_2$CH$_2$OH | a |
| 40 | —Cl (p) | —OCH$_3$ (o) | CH$_3$ \| —NHCH$_2$CHNH$_2$ | —NH(CH$_2$)$_2$N(CH$_3$)$_2$ | a |
| 41 | —CH$_3$ (m) | —OCH$_3$ (o) | CH$_3$ \| —NHCH$_2$CHNH$_2$ | CH$_3$ \| —NHCH$_2$CHNH$_2$ | b |
| 42 | —CH$_3$ (m) | —CH$_3$ (o) | CH$_3$ \| —NHCH$_2$CHNH$_2$ | CH$_3$ \| —NHCH$_2$CHNH$_2$ | a |
| 43 | H | H | CH$_3$ \| —NHCH$_2$CHNH$_2$ | CH$_3$ \| —NHCH$_2$CHNH$_2$ | d |
| 44 | H | H | CH$_3$ \| —NHCH$_2$CHNH$_2$ | —NH(CH$_2$)$_3$N(C$_2$H$_5$)$_2$ | d |
| 45 | H | H | —NH(CH$_2$)$_2$NH$_2$ | —NH(CH$_2$)$_3$N(C$_2$H$_5$)$_2$ | d |

EXAMPLE 46

The dyestuff of Example 1, in form of a wet press cake obtained after filtration which contains 52 parts of pure dyestuff, is stirred into 500 parts of water, and 20 parts of formic acid are added. By heating to 80° the dyestuff dissolves completely. This dyestuff solution is evaporated to dryness. The dyestuff salt having the formula

APPLICATION EXAMPLE 8

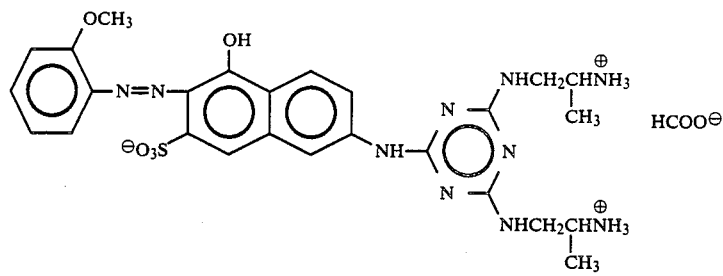

is obtained in powder form which has good solubility in cold water.

Instead of using formic acid according to Example 46 any further organic acid such as lactic, acetic or methoxyacetic acid for a mixture thereof may be used to form external salts.

By a method analogous to that described in Example 46 the dyes of Examples 2 to 45 may also be converted into acid addition salt form.

EXAMPLE 47

The wet press cake obtained in Example 1 is added at room temperature to a solution of 20 parts of dextrin, 20 parts of formic acid and 500 parts of water and is dissolved by heating to 80°. By spray drying red granulates are obtained which are well soluble in water and dye paper a scarlet shade.

In analogous manner, the dyes of Examples 2–45 may also be converted into granulates.

EXAMPLE 48

The wet press cake obtained in Example 1 is added to a solvent mixture of 20 parts of formic acid, 20 parts of lactic acid and 250 parts of water and is dissolved by heating to 70°. Subsequently, to this solution 30 parts of ethylene glycol are added, and the dyestuff solution is filtered clear in the presence of a filtering auxiliary. The filtrate is cooled to room temperature and is adjusted to 520 parts by adding water. A ready-to-use dyestuff solution is obtained which is stable to storage for several months. This dyestuff solution may be used directly or thinned with water in dyeing paper where paper dyeings of scarlet shades are obtained.

In analogous manner, the dyes of Examples 2–45 may be converted into stable liquid preparations.

In the following examples the application of the dyestuffs and dyeing preparations thereof according to the invention is illustrated.

Application Example A

70 Parts of chemically bleached sulphite cellulose obtained from pinewood and 30 parts of chemically bleached sulphite cellulose obtained from birchwood are ground in 2000 parts of water in a Hollander. 0.2 Parts of the dyestuff according to Example 1 or 2 (as an acid addition salt, e.g., according to Example 46) are sprinkled into this pulp or 2.0 parts of the liquid dyeing preparation according to Example 48 are added thereto. Paper is produced from this pulp after mixing for 20 minutes. The absorbent paper which is obtained in this manner in all cases is dyed a scarlet shade. The waste water is practically colourless.

0.3 Parts of the dyestuff powder according to Example 1 or 2 (as an acid addition salt, e.g., according to Example 46) are dissolved in 100 parts of hot water and cooled to room temperature. This solution is added to 100 parts of chemically bleached sulphite cellulose which have been ground in a Hollander with 2000 parts of water. Sizing takes place after thorough mixing for 15 minutes. The paper which is produced from this material has a scarlet shade (for each case) and shows good waste water and wet fastness properties.

Application Example C

An absorbent length of unsized paper is drawn at 40°–50° through a dyestuff solution having the following composition:

| | | |
|---|---|---|
| 0.3 parts | of the dyestuff according to Example 1 or 2 (as an acid addition salt, e.g. according to Example 46) or 3 parts of the liquid dyeing preparation according to Example 48, | |
| 0.5 parts | of starch and | |
| 99.0 parts | of water. | |

The excess dyestuff solution is squeezed out through two rollers. The dried length of paper in each case is dyed a scarlet shade.

The dyestuffs of Examples 3–45 (in an acid addition salt form) or a dyeing preparation thereof according to Example 47 or 48 may also be used for dyeing by a method analogous to that of Application Examples A to C. The obtained paper dyeings show good fastness properties.

Application Example D 0.2 Parts of the dyestuff of Example 1 in acid addition salt form (according to Example 46) are dissolved in 4000 parts of demineralised water at 40°. 100 Parts of a pre-wetted cotton textile substrate are added, and the bath is raised to the boiling point over 30 minutes and held at the boil for one hour. Any water which evaporates during dyeing is replaced continuously. After rinsing and drying, a scarlet dyeing is obtained having good light and wet fastness properties. The dyestuff exhausts practically totally onto the fibre, and the waste water is almost colourless.

In a similar manner as described in Application Example D the dyestuffs according to Examples 2–45 may be used for dyeing cotton.

Application Example E

100 Parts freshly tanned and neutralized chrome leather are agitated for 30 minutes in a vessel with a liquor consisting of 250 parts of water at 55° and 0.5 parts of the dyestuff of Example 1 in an acid addition salt form, and then treated in the same bath for 30 minutes with 2 parts of an anionic fatty licker based on sulphonated train oil. The leather is then dried and prepared in the normal way, giving a leather evenly dyed in a scarlet shade.

Further vegetable-tanned leathers of low affinity may be dyed using the dyestuff of Example 1 in accordance with known methods.

By a method analogous to that described in Application Example E the dyestuffs according to Examples 2–45 may be used for dyeing leather.

What is claimed is:

1. A metal-free compound of the formula

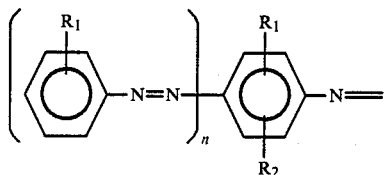

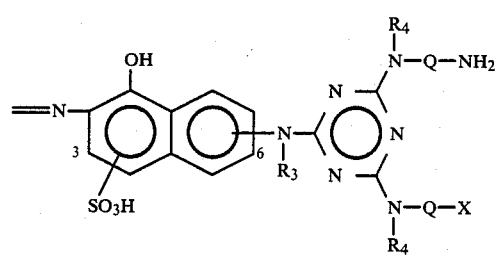

or a 1:1 copper complex of a metallizable metal-free compound of said formula or an internal or external salt of a metal-free compound of said formula or of a 1:1 copper complex of a metallizable metal-free compound of said formula, wherein each Q is independently linear or branched $C_{2-6}$alkylene; linear or branched $C_{2-6}$alkylene interrupted by —O—, —S— or —NR$_4$—; linear or branched $C_{3-6}$alkylene monosubstituted or disubstituted by hydroxy or —*NHCO—CH$_2$—, wherein the * denotes the atom attached to the —NR$_4$— radical, each R$_1$ is independently hydrogen, halo, nitro, $C_{1-4}$alkyl, $C_{1-4}$alkoxy, ($C_{1-4}$alkyl)carbonylamino, —SO$_2$NR$_3$R$_4$, —CONR$_4$—C$_6$H$_5$ or benzamido, R$_2$ is hydrogen, hydroxy, halo, nitro, $C_{1-4}$alkyl, $C_{1-4}$alkoxy, ($C_{1-4}$alkyl)carbonylamino or —NHCONR$_3$R$_4$, X is —NR$_5$R$_6$ or —N$^{\oplus}$R$_7$R$_8$R$_9$ An$^{\ominus}$, wherein each of R$_5$ and R$_6$ is independently hydrogen; $C_{1-6}$alkyl; $C_{2-6}$alkyl monosubstituted by hydroxy or cyano; phenyl; phenyl substituted by 1 to 3 substituents selected from chloro, $C_{1-4}$alkyl and $C_{1-4}$alkoxy; phenyl($C_{1-4}$alkyl); phenyl($C_{1-4}$alkyl) the phenyl group of which is substituted by 1 to 3 substituents selected from chloro, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, or —NR$_5$R$_6$ is an unsubstituted 5- or 6-membered saturated or unsaturated ring containing a total of 1 to 3 hetero atoms or a 5- or 6-membered saturated or unsaturated ring containing a total of 1 to 3 hetero atoms which ring is substituted by 1 to 3 substituents selected from $C_{1-4}$alkyl, $C_{2-4}$alkyl monosubstituted by hydroxy and $C_{2-4}$alkyl monosubstituted by amino, each of R$_7$ and R$_8$ is independently $C_{1-6}$alkyl; $C_{2-6}$alkyl monosubstituted by hydroxy or cyano; phenyl; phenyl substituted by 1 to 3 substituents selected from chloro, $C_{1-4}$alkyl and $C_{1-4}$-alkoxy; phenyl($C_{1-4}$alkyl); phenyl($C_{1-4}$alkyl) the phenyl group of which is substituted by 1 to 3 substituents selected from chloro, $C_{1-4}$alkyl and $C_{1-4}$-alkoxy; $C_{5-6}$cycloalkyl or $C_{5-6}$-cycloalkyl substituted by 1 to 3 $C_{1-4}$alkyl groups, or —N$^{\oplus}$R$_7$R$_8$— is an unsubstituted 5- or 6-membered saturated or unsaturated ring containing a total of 1 to 3 hetero atoms or a 5- or 6-membered saturated or unsaturated ring containing a total of 1 to 3 hetero atoms which ring is substituted by 1 to 3 substituents selected from $C_{1-4}$alkyl, $C_{2-4}$alkyl monosubstituted by hydroxy and $C_{2-4}$-alkyl monosubstituted by amino, R$_9$ is $C_{1-4}$alkyl or benzyl, or —N$^{\oplus}$R$_7$R$_8$R$_9$ is pyridinium or pyridinium monosubstituted or disubstituted by methyl, and An$^{\ominus}$ is a non-chromophoric anion, and n is 0 or 1, wherein each R$_3$ is independently hydrogen, $C_{1-4}$alkyl or $C_{1-4}$alkyl monosubstituted by hydroxy, halo, cyano or $C_{1-4}$alkoxy, and each R$_4$ is independently hydrogen or $C_{1-4}$alkyl, where each halo is independently fluoro, chloro or bromo, with the provisos that (i) each hydroxy substituent of each hydroxy-substituted alkyl group and linear or branched alkylene radical attached to a nitrogen atom is in other than the 1-position, (ii) each alkoxy substituent of each alkoxy-substituted alkyl group attached to a nitrogen atom is in other than the 1-position, and (iii) the hydroxy groups of each linear or branched alkylene radical disubstituted by hydroxy are attached to different carbon atoms.

2. A metal-free compound according to claim 1, or an internal or external salt thereof.

3. A metal-free compound according to claim 2, or an internal or external salt thereof, wherein n is 0.

4. A metal-free compound according to claim 3, or an internal or external salt thereof, wherein R$_1$ is hydrogen, chloro, nitro, $C_{1-2}$alkyl, $C_{1-2}$alkoxy, acetamido, —SO$_2$NR$_{3a}$R$_{4a}$, —CONR$_{4a}$—C$_6$H$_5$ or benzamido, wherein R$_{3a}$ is hydrogen, methyl, ethyl or 2-hydroxyethyl, and R$_{4a}$ is hydrogen or methyl, R$_2$ is hydrogen, hydroxy, $C_{1-2}$alkyl, $C_{1-2}$alkoxy, acetamido or —NHCONH$_2$, R$_3$ is hydrogen, methyl, ethyl or 2-hydroxyethyl, each R$_4$ is independently hydrogen or methyl, each Q is independently linear or branched $C_{2-4}$alkylene, linear or branched $C_{3-4}$alkylene monosubstituted by hydroxy or —(CH$_2$)$_a$—Y—(CH$_2$)$_a$—, wherein Y is —O— or —NR$_{4a}$—, wherein R$_{4a}$ is hydrogen or methyl, and each a is independently 2 or 3, and X is —NR$_{5a}$R$_{6a}$ or —N$^{\oplus}$R$_{7a}$R$_{8a}$R$_{9a}$ An$^{\ominus}$, wherein each of R$_{5a}$ and R$_{6a}$ is independently hydrogen, $C_{1-6}$alkyl, $C_{2-3}$hydroxyalkyl or benzyl, or —NR$_{5a}$R$_{6a}$ is pyrrolidino, piperidino, morpholino, piperazino or N'-methylpiperazino, each of R$_{7a}$ and R$_{8a}$ is independently $C_{1-6}$alkyl or $C_{2-3}$hydroxyalkyl, and R$_{9a}$ is methyl, ethyl or benzyl, or —N$^{\oplus}$R$_{7a}$R$_{8a}$R$_{9a}$ is pyridinium or pyridinium monosubstituted or disubstituted by methyl, and An$^{\ominus}$ is a non-chromophoric anion.

5. A metal-free compound according to claim 4, or an internal or external salt thereof, wherein
the —NR$_3$— radical is in the 6-position of the naphthalene ring, and
the —SO$_3$H group is in the 3-position of the naphthalene ring.

6. A metal-free compound according to claim 2, or an internal or external salt thereof, wherein
each R$_1$ is independently hydrogen, chloro, nitro, methyl, methoxy or acetamido, and
R$_2$ is hydrogen, hydroxy, C$_{1\text{-}2}$-alkyl or C$_{1\text{-}2}$alkoxy.

7. A metal-free compound according to claim 2, or an internal or external salt thereof, wherein each Q is independently linear or branched C$_{2\text{-}4}$-alkylene, linear or branched C$_{3\text{-}4}$alkylene monosubstituted by hydroxy or —(CH$_2$)$_a$—Y—(CH$_2$)$_a$—, wherein Y is —O— or —NR$_{4a}$—, wherein R$_{4a}$ is hydrogen or methyl, and each a is independently 2 or 3.

8. A metal-free compound according to claim 7, or an internal or external salt thereof, wherein
X is —NR$_{5a}$R$_{6a}$ or —N$^\oplus$R$_{7a}$R$_{8a}$R$_{9a}$ An$^\ominus$,
wherein each of R$_{5a}$ and R$_{6a}$ is independently hydrogen, C$_{1\text{-}6}$alkyl, C$_{2\text{-}3}$hydroxyalkyl or benzyl, or
—NR$_{5a}$R$_{6a}$ is pyrrolidino, piperidino, morpholino, piperazino or N'-methylpiperazino,
each of R$_{7a}$ and R$_{8a}$ is independently C$_{1\text{-}6}$alkyl or C$_{2\text{-}3}$hydroxyalkyl, and
R$_{9a}$ is methyl, ethyl or benzyl, or
—N$^\oplus$R$_{7a}$R$_{8a}$R$_{9a}$ is pyridinium or pyridinium monosubstituted or disubstituted by methyl, and
An$^\ominus$ is a non-chromophoric anion.

9. An internal or external salt according to claim 8 which is an internal or external salt of a metal-free compound of the formula

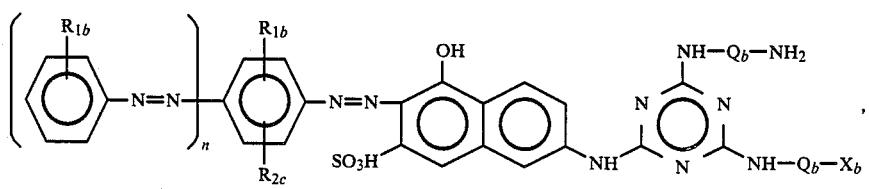

wherein
each R$_{1b}$ is independently hydrogen, chloro, nitro, methyl, methoxy or acetamido,
R$_{2c}$ is hydrogen, methyl or methoxy,
each Q$_b$ is independently —(CH$_2$)$_a$—,

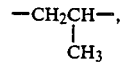

or —CH$_2$CH$_2$—NH—CH$_2$CH$_2$—, wherein a is 2 or 3, and
X$_b$ is —NR$_{5b}$R$_{6b}$ or —N$^\oplus$R$_{7b}$R$_{8b}$R$_{9b}$ An$^\ominus$,
wherein each of R$_{5b}$ and R$_{6b}$ is hydrogen, C$_{1\text{-}4}$alkyl or 2-hydroxyethyl, with the proviso that R$_{5b}$ and R$_{6b}$ are identical, or
—NR$_{5b}$R$_{6b}$ is piperidino, morpholino, piperazino or N'-methylpiperazino,
each of R$_{7b}$ and R$_{8b}$ is C$_{1\text{-}4}$alkyl or 2-hydroxyethyl, with the proviso that R$_{7b}$ and R$_{8b}$ are identical, and
R$_{9b}$ is methyl, ethyl or benzyl, or
—N$^\oplus$R$_{7b}$R$_{8b}$R$_{9b}$ is pyridinium or pyridinium monosubstituted by method, and
An$^\ominus$ is a non-chromophoric anion, and
n is 0 or 1.

10. An internal or external salt according to claim 9, wherein
R$_{1b}$ is hydrogen, and
n is 0,
with the proviso that when R$_{2c}$ is methoxy it is ortho to the —N=N— radical.

11. An internal or external salt according to claim 10, wherein
each Q$_b$ is —(CH$_2$)$_a$— or

—CH$_2$CH—,
          |
          CH$_3$ wherein each a is 2 or 3, with the proviso that the two Q$_b$ groups are identical, and
X$_b$ is —NH$_2$.

12. The internal salt according to claim 11 having the formula

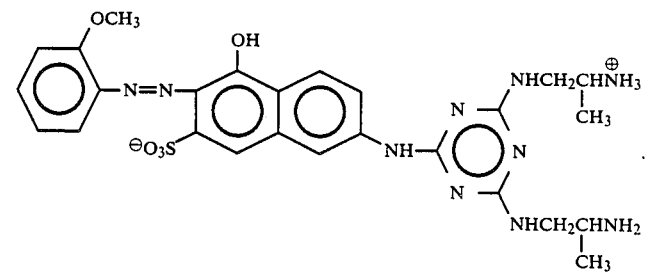

13. The internal salt according to claim 10 having the formula

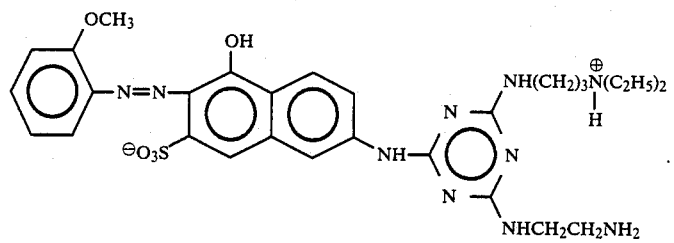

14. The metal-free compound according to claim 8 having the formula

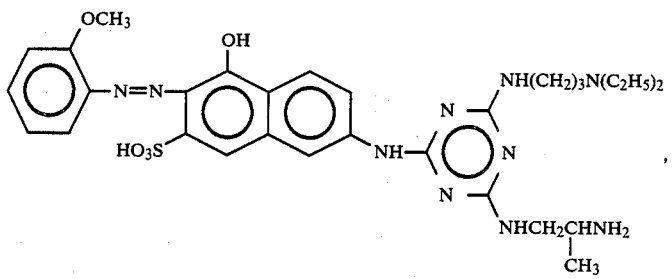

or an internal or external salt thereof.

15. The metal-free compound according to claim 8 having the formula

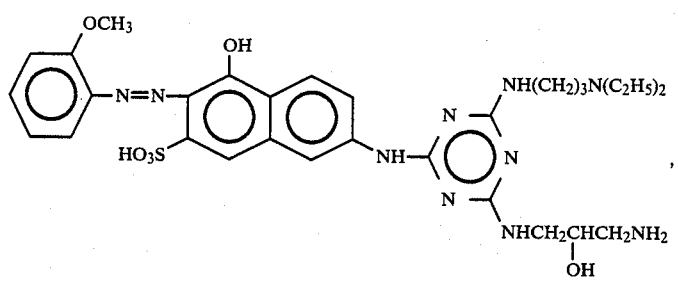

or an internal or external salt thereof.

16. The metal-free compound according to claim 8 having the formula

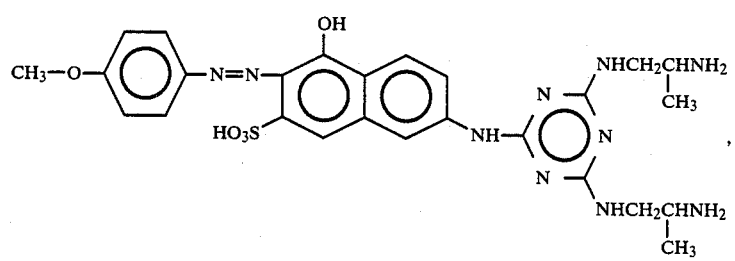

or an internal or external salt thereof.

17. A 1:1 copper complex according to claim 1, or an internal or external salt thereof.

18. A storage stable, aqueous liquid dye composition containing a water-soluble internal or external salt according to claim 1.

19. A process for dyeing or printing a hydroxy group- or nitrogen-containing organic substrate comprising applying to a hydroxy group- or nitrogen-containing organic substrate a water-soluble internal or external salt according to claim 1.

20. A process according to claim 19, wherein the substrate is paper, leather or a textile containing or consisting of cellulose.

* * * * *